UNITED STATES PATENT OFFICE.

OTTO ERNST AND ALFRED PHILIPS, OF HÖCHST-ON-THE-MAIN, GERMANY.

MATERIAL FOR PURIFYING ACETYLENE GAS.

SPECIFICATION forming part of Letters Patent No. 647,295, dated April 10, 1900.

Application filed June 28, 1899. Serial No. 722,208. (No specimens.)

*To all whom it may concern:*

Be it known that we, OTTO ERNST and ALFRED PHILIPS, subjects of the Emperor of Germany, and residents of Höchst-on-the-Main, near Frankfort, Germany, have invented certain new and useful Improvements in Materials for Purifying Acetylene Gas, of which the following is a specification.

The object of this invention is to produce material for purifying acetylene gas, the said material possessing the advantages of great cheapness, energetic action, and harmlessness toward the gas itself.

In purifying acetylene gas materials have been hitherto employed either in the dissolved state or in solid form. The use of solutions has the disadvantage that the liquid must either be absorbed by some porous material, such as kieselguhr, (infusorial earth,) or be applied in a washing contrivance, which is usually of inconvenient form and requires considerable attention, and also some manipulative skill is demanded on account of the acid character of the liquid. Therefore the use of solid purifying agents has advantages, especially in the case of small illumination systems, such as house installations, table-lamps, and the like.

Among the solid materials which are capable of purifying acetylene from its impurities (phosphoreted hydrogen, ammonia, and hydrogen sulfid) the salts of hypochlorous acid are very advantageous on account of their acting well in the dry state and their cheapness. The calcium salt takes the first place among the hypochlorites, being easily obtainable in the form of bleaching-powder. Certain obstacles are incidental to the use of bleaching-powder in its commercial form, rendering its application to the purifying of acetylene gas impracticable. In moist air it forms lumps which cannot well be penetrated by the gas and therefore gives rise to waste of material. Moreover, it has been observed (*Acetylen in Wissenschaft und Industrie,* erster Jahrgang, 1898, Heft 23, S. 276) that when ordinary bleaching-powder is used in purifying acetylene gas it becomes heated in consequence of decomposition and so constitutes a source of danger, and in using bleaching-powder, as is also the case with all other solid purifiers hitherto employed, in order to bring the gas into close contact with the purifying agent, it becomes necessary either to spread it on wire trays or sieves in the purifier or to mix it with light chemically-inactive materials, such as kieselguhr, pumice, or the like. In both cases the purifying material occupies a large space.

We have succeeded in preparing from bleaching-powder or other hypochlorites a purifying material in fragments, which material is highly porous and yet so solid that it is unnecessary either to spread it on trays or to convert it into loose bulky masses by admixture with inert substances before it can be applied industrially in an economical manner. Spontaneous heating of the material is thus avoided, and the material remains highly porous and effective even under the influence of moisture.

The new purifying material according to this invention is obtained by mixing the hypochlorite to a sludge with some substance indifferent to acetylene gas, spreading out the sludge in a thin layer, and then drying it at such temperature that no decomposition of the hypochlorite will occur. For admixture with the hypochlorite all those substances can be used which on the one hand are without deteriorating influence on acetylene gas and on the other hand yield a highly-porous material when mixed with the salt and subsequently dried. In the first rank must be placed slaked lime, calcium carbonate, and similar substances. Calcium chlorid can also be advantageously employed as the indifferent diluent, because it gives up its water of crystallization when dried, forming bubbles and pores.

Most descriptions of bleaching-powder contain, in addition to hypochlorite, slaked lime and calcium chlorid in quantity sufficient to admit of their being treated in the manner indicated above without further admixture.

The following examples represent working methods of preparing the new material. They are, however, examples merely, and the invention is not limited strictly to them.

Example I: Twenty kilos of bleaching-powder are stirred into a uniform sludge with water and treated with a similar sludge composed of five kilos of slaked lime and five kilos of calcium chlorid with water. The mass is thoroughly incorporated and dried in vacuo at 100° centigrade, it being advantageous to spread the material in comparatively-thin layers on drying-trays. The mass in drying becomes highly porous and sufficiently hard to allow of its being broken into fragments of convenient size without falling to powder. Although drying *in vacuo* is an assistance to the production of a highly-porous condition, the vacuum can be dispensed with under certain conditions, always provided that the temperature does not rise so high as to risk decomposing the bleaching-powder.

Example II: Fifty kilos of bleaching-powder are stirred to a sludge with thirty kilos of water and treated with forty kilos of calcined sodium carbonate while stirring. The well-mixed paste, which now contains sodium hypochlorite and calcium carbonate as a result of decomposition, is mixed with ten kilos of calcium chlorid and dried, preferably in vacuo, at about 90° centigrade. This also yields a highly-porous solid cleansing-paste.

It is obvious that Example II can be so modified that chlorin is passed into a concentrated solution of alkali and the alkali hypochlorite obtained in this manner treated with the necessary quantity of slaked lime or calcium chlorid. Similarly, the process can be applied when other methods of preparing the hypochlorid are used or can be made to directly follow these.

Having now particularly described and ascertained the nature of this invention and in what manner the same is to be performed, we declare that what we claim is—

1. For purifying acetylene gas, a material consisting of a solid, highly-porous material containing a salt of hypochlorous acid, and capable of remaining porous and effective under the influence of moisture.

2. For purifying acetylene gas, a material consisting of a solid, highly-porous material containing a salt of hypochlorous acid and slaked lime.

3. For purifying acetylene gas a material consisting of a solid, highly-porous material containing a salt of hypochlorous acid, slaked lime and calcium chlorid.

4. The manufacture of a purifying material for acetylene gas, by stirring a salt of hypochlorous acid to a sludge, with a substance or substances not attacked by acetylene gas, and then drying the sludge at such a temperature that the salt of hypochlorous acid does not decompose.

5. The manufacture of a solid, highly-porous purifying material for acetylene gas by stirring bleaching-powder to a sludge with some indifferent material suitable for use with acetylene, and then drying the sludge at such temperature that the salt of hypochlorous acid does not decompose.

6. The manufacture of a solid, highly-porous purifying-paste for acetylene gas by stirring bleaching-powder into a sludge with slaked lime, and then drying the sludge at such a temperature that the salt of hypochlorous acid does not decompose.

7. The manufacture of a solid, highly-porous purifying-paste for acetylene gas by stirring bleaching-powder into a sludge with slaked lime and calcium chlorid, and then drying the sludge at such a temperature that the salt of hypochlorous acid does not decompose.

8. In the production of a material for purifying acetylene gas the combination of a process for obtaining a solid, highly-porous material containing a salt of hypochlorous acid with a process for obtaining the hypochlorite, in which the hypochlorous liquor obtained by the latter process is stirred into a sludge with some indifferent material and the sludge then dried at such a temperature that the salt of hypochlorous acid does not decompose.

In testimony whereof we have signed our names to this specification in the presence of two subscribing witnesses.

OTTO ERNST.
ALFRED PHILIPS.

Witnesses:
FRANZ HASSLACHER,
MICHAEL VOLK.